（12）United States Patent
Ohtsuka et al.

(10) Patent No.: US 6,687,568 B2
(45) Date of Patent: Feb. 3, 2004

(54) TRANSPORTATION SYSTEM

(75) Inventors: Hirofumi Ohtsuka, Itami (JP); Ryoji Ogata, Tokyo (JP); Taichi Yanaru, Itami (JP)

(73) Assignees: Mitsubishi Denki Kabushiki Kaisha, Tokyo (JP); Ryoden Semiconductor System Engineering Corporation, Itami (JP)

( * ) Notice: Subject to any disclaimer, the term of this patent is extended or adjusted under 35 U.S.C. 154(b) by 0 days.

(21) Appl. No.: 10/128,308

(22) Filed: Apr. 24, 2002

(65) Prior Publication Data

US 2003/0093176 A1 May 15, 2003

(30) Foreign Application Priority Data

Nov. 12, 2001 (JP) ........................................ 2001-346272

(51) Int. Cl.⁷ ................................................. G06F 7/00
(52) U.S. Cl. ..................... 700/213; 104/88.01; 700/214; 700/228
(58) Field of Search ................................. 700/214, 213, 700/228; 414/273; 198/301; 104/88.01, 88.02, 88.03, 88.04

(56) References Cited

U.S. PATENT DOCUMENTS

| | | | | |
|---|---|---|---|---|
| 3,119,501 A | * | 1/1964 | Lemelson | .................. 414/273 |
| 3,927,773 A | * | 12/1975 | Bright | .................. 414/273 |
| 3,956,994 A | * | 5/1976 | Barry | .................. 104/88.02 |
| 4,726,299 A | * | 2/1988 | Anderson | .................. 104/88.02 |
| 4,766,547 A | * | 8/1988 | Modery et al. | .................. 700/229 |
| 5,211,523 A | * | 5/1993 | Andrada Galan et al. | .. 414/282 |
| 5,335,601 A | * | 8/1994 | Matsumoto et al. | ..... 104/88.01 |
| 5,551,348 A | * | 9/1996 | Matsumoto | .................. 104/88.02 |
| 5,564,879 A | * | 10/1996 | Noguchi | .................. 414/268 |
| 5,568,393 A | * | 10/1996 | Ando et al. | .................. 700/214 |
| 5,690,463 A | * | 11/1997 | Yoshie | .................. 414/266 |
| 6,477,442 B1 | * | 11/2002 | Valerino, Sr. | .................. 700/213 |

FOREIGN PATENT DOCUMENTS

| | | |
|---|---|---|
| JP | 57-9614 | 1/1982 |
| JP | 5-19850 | 7/1993 |
| JP | 11-95836 | 4/1999 |

* cited by examiner

*Primary Examiner*—Richard Ridley
(74) *Attorney, Agent, or Firm*—Leydig, Voit & Mayer, Ltd.

(57) ABSTRACT

A transportation system includes lifts for inter-floor carriage, a carrier cart for intra-floor carriage, and a transit stocker for loading/unloading an article to/from the lift. For each of the lifts, operation status, that is, operating or not, is recorded in a database. The operating rate of each lift, carriage queue for each lift, and an inventory of each transit stocker might also be recorded in the database. When carriage of an article is required, a lift optimum for the carriage is selected from among the lifts based on the information recorded on the database.

3 Claims, 11 Drawing Sheets

FIG. 4 process flow table

| lot No. | departure stocker | destination stocker | completion flag |
|---|---|---|---|
| 0001 | 6a | 6b | 1 |
| 0001 | 6b | 6d | |
| 0001 | 6d | 6g | |
| 0002 | 6b | 6c | |
| 0002 | 6c | 6e | |
| 0003 | 6d | 6c | 1 |
| 0003 | 6c | 6a | |
| 0003 | 6a | 6g | |
| ⋮ | ⋮ | ⋮ | |

FIG. 5 carriage route table

| route No. | departure stocker | destination stocker | lift | transit stocker 1 | transit stocker 2 | distance in floor 2a | distance in floor 2b | distance in floor 2c | distance in floor 2d |
|---|---|---|---|---|---|---|---|---|---|
| ... | ... | ... | ... | ... | ... | | ... | ... | |
| 501 | 6b | 6d | 4a | 8a | 8e | | 10 | 40 | |
| 502 | 6b | 6d | 4b | 8b | 8f | | 20 | 50 | |
| 503 | 6b | 6d | 4c | 8c | 8g | | 50 | 40 | |
| 504 | 6b | 6d | 4d | 8c | 8g | | 50 | 40 | |
| 505 | 6b | 6d | 4e | 8d | 8h | | 40 | 20 | |
| 506 | 6b | 6e | 4f | 8d | 8j | | 40 | 15 | |
| 507 | 6b | 6e | 4a | 8a | 8e | | 10 | 30 | |
| 508 | 6b | | 4b | 8b | 8f | | 20 | 20 | |
| ... | ... | ... | ... | ... | ... | | ... | ... | |
| 801 | 8a | 6d | 4b | 8b | 8f | | 10 | 50 | |
| 802 | 8a | 6d | 4c | 8c | 8g | | 40 | 40 | |
| ... | ... | ... | ... | ... | ... | | ... | ... | |

FIG. 6 stocker status table

| stocker No. | capacity | inventories | reservations | inventory index | status | articles of expectancy | operating rate | transporter 1 status | transporter 2 status | transporter 3 status |
|---|---|---|---|---|---|---|---|---|---|---|
| 6a | 55 | 15 | 2 | 31% | operating | 2 | 35% | operating | operating | n/a |
| 6b | 70 | 30 | 0 | 43% | operating | 0 | 50% | operating | operating | n/a |
| 6c | 50 | 20 | 6 | 52% | operating | 5 | 65% | fault | operating | n/a |
| 6d | 60 | 15 | 4 | 32% | operating | 3 | 30% | operating | operating | n/a |
| 6e | 80 | 20 | 1 | 26% | operating | 1 | 40% | operating | n/a | n/a |
| 8a | 50 | 10 | 2 | 24% | operating | 2 | 50% | operating | n/a | n/a |
| 8b | 70 | 10 | 4 | 20% | operating | 4 | 20% | operating | operating | n/a |
| 8c | 55 | 30 | 1 | 56% | operating | 1 | 10% | operating | fault | n/a |
| 8d | 60 | 5 | 3 | 13% | operating | 3 | 5% | operating | operating | operating |
| 8e | 100 | 0 | 5 | 5% | operating | 5 | 15% | operating | operating | n/a |
| 8f | 45 | 40 | 0 | 89% | operating | 0 | 60% | operating | operating | n/a |
| 8g | 60 | 0 | 0 | 0% | fault | 0 | 5% | operating | operating | n/a |
| 8h | 70 | 65 | 1 | 94% | operating | 1 | 70% | operating | operating | n/a |
| ... | ... | ... | ... | ... | ... | ... | ... | ... | ... | ... |

FIG. 7 lift status table

| lift No. | capability | operating rate (percentage) | current status | articles on waiting list |
|---|---|---|---|---|
| 4a | 500 | 50 | fault | 3 |
| 4b | 700 | 70 | operating | 5 |
| 4c | 800 | 40 | operating | 0 |
| 4d | 500 | 90 | operating | 2 |
| 4e | 600 | 20 | operating | 1 |
| 4f | 500 | 40 | operating | 1 |
| ⋮ | ⋮ | ⋮ | ⋮ | ⋮ |

FIG. 8 priority type flag

| flag | priority |
|---|---|
| A | equalize operating rates of lifts |
| B | use lift 4a preferentially |
| C | minimize inventories in transit stockers |
| D | use lift of fewer waiting |
| E | use floor of high capability preferentially |
| F | equalize operating rates of floors |
| ⋮ | ⋮ |

FIG. 9 waiting list table

| waiting No. | lot No. | departure | shelf No. | destination |
|---|---|---|---|---|
| 1 | 0002 | stocker 8a | 12 | stocker 8e |
| 2 | 0035 | stocker 8e | 07 | stocker 8a |
| 3 | 0009 | stocker 8a | 13 | stocker 8e |
| 4 | 0014 | stocker 8a | 03 | stocker 8e |
| 5 | 0018 | stocker 8e | 04 | stocker 8a |
| ⋮ | ⋮ | ⋮ | ⋮ | ⋮ |

FIG. 10 floor status table

| floor No. | capability | operating rate | status | articles on waiting list |
|---|---|---|---|---|
| 2a | 10000 | 70% | operating | 18 |
| 2b | 20000 | 50% | operating | 32 |
| 2c | 15000 | 90% | operating | 50 |
| 2d | 25000 | 60% | operating | 26 |

FIG. 11 process flow table

| lot No. | present process | next process | completion flag |
|---|---|---|---|
| 0001 | P1 | P2 | 1 |
| 0001 | P2 | P6 | |
| 0001 | P6 | P5 | |
| 0002 | P2 | P7 | |
| 0002 | P7 | P6 | |
| 0003 | P4 | P9 | 1 |
| 0003 | P9 | P1 | |
| 0003 | P1 | P5 | |
| ⋮ | ⋮ | ⋮ | |

FIG. 12 process - stocker relation table

| process | stocker |
|---|---|
| ⋮ | ⋮ |
| P5 | 6a |
| P5 | 6g |
| P6 | 6d |
| P6 | 6e |
| P7 | 6c |
| ⋮ | ⋮ |

TRANSPORTATION SYSTEM

BACKGROUND OF THE INVENTION

The present invention relates to a transportation system for performing intra-floor and inter-floor transportation of semi-processed products, in a manufacturing factory where a manufacturing line extends over a plurality of floors. More particularly, the present invention relates to a transportation system including a lift for inter-floor carriage, a carrier cart for intra-floor carriage, and a transit stocker for loading/unloading of an article to and from the lift.

A transportation system used in a manufacturing factory is disclosed in, for example, Japanese Unexamined Patent Publication No. Hei 5-19850, Japanese Unexamined Patent Publication No. Sho. 57-9614, and Japanese Unexamined Patent Publication No. Hei 11-95836.

The transportation system disclosed in Japanese Unexamined Patent Publication No. Hei 5-19850 includes a plurality of transporting stages for transferring an article from a carrier cart to a working machine, and each of the transporting stages includes a fault detector. A fault of the transporting stage is detected by the fault detector and stored in a controller for a carrier cart. When having received a carriage order from an order computer, the controller decides whether a transporting stage is broken down or not and, if the transporting stage is broken down, reports it to the order computer to thereby receive another instruction for changing the destination to another transporting stage. Thus, the transportation system disclosed in Japanese Unexamined Patent Publication No. Hei 5-19850 avoids a situation in which the carrier cart confusedly stops at a faulty transporting stage, thereby smoothing the operation of the carrier cart.

The transportation system disclosed in Japanese Unexamined Patent Publication No. Sho. 57-9614 includes a plurality of carrier elevators, a guide path along which a carrier cart travels, and guide branches for guiding the carrier cart to each of the elevators. Each elevator includes a sensor which, when it detects use of the elevator, opens a contact of a corresponding guide branch via a relay so that the carrier cart might not be guided to the elevator in use. Thus, the transportation system disclosed in Japanese Unexamined Patent Publication No. Sho. 57-9614 guides a carrier cart to an elevator not in use, to shorten waiting time for the elevator, thus improving the operation efficiency of the carrier cart.

Japanese Unexamined Patent Publication No. Hei 11-95836 discloses a transportation system in which a carrier cart travels along a loop-shaped track laid on a floor. A plurality of parts mounting stages and a plurality of parts dismounting stages are arranged along the track. To guide the carrier cart to these parts mounting/dismounting stages, the track is provided with branches. When the carrier cart has gone around the track and returned to its point of departure, it receives a radio signal of the data of the next round-travel path. The carrier cart then travels and branches according to this received path data to visit the parts mounting stage and the parts dismounting stage, and returns to the point of departure again. Thus, the transportation system disclosed in Japanese Unexamined Patent Publication No. Hei 11-95836 issues a radio signal of new path data each time the carrier cart goes around the track. Therefore, one carrier cart is efficiently utilized along a plurality of paths so that carrier carts exclusively provided for respective paths are not necessary. Moreover, it is unnecessary to re-write path data by hand.

The transportation system disclosed in Japanese Unexamined Patent Publication No. Hei 5-19850 carries the article to another stage in the case where a destination stage has broken down. However, the transportation system of this publication is provided with only one path for each stage, so that selection of an optimum path among a plurality of possible paths is not considered. Moreover, this publication is intended for a transportation system that carries an article within a single floor, and therefore, cannot be applied to a transportation system in which a carrier cart for carriage within a floor and a lift for carriage between floors are combined.

Likewise, the transportation system disclosed in Japanese Unexamined Patent Publication No. Sho. 57-9614 selects a vacant elevator among elevators having the equivalent functions. Therefore, the transportation system of this publication cannot decide which one of the elevators should be selected if their types differ from one another or if they are disposed far away from one another.

Further, in the transportation system disclosed in Japanese Unexamined Patent Publication No., Hei 11-95836 although a carriage route is supplied to the carrier cart each time the carrier cart travels around, each carriage route is previously assigned to a respective parts mounting stage and parts dismounting stage at which the carrier cart is to stop. Moreover, this publication is also directed to a transportation system that carries an article within a single floor, and therefore, cannot be applied to a transportation system in which a carrier cart for carriage within a floor and a lift for carriage between floors are combined.

Thus, the prior arts have not kept in mind such a transportation system in which a carrier for intra-floor carriage and a lift for inter-floor carriage are combined and a plurality of carriage routes can be selected for each pair of departure and destination points. Also, even in the case where a plurality of carriage facilities (transporting stages or elevators) are arranged in parallel with one another, a facility to be used is decided based only on whether it is usable and not on other factors, such as its operating rate or time required for carriage.

Accordingly, it is difficult to select an optimal carriage route even in a modem manufacturing factory in which a manufacturing line is provided over a plurality of floors to enable selecting a variety of carriage routes, so that, in practice, articles are carried along a carriage route determined beforehand. Therefore, at a specific one of transit stockers for transferring articles between, for example, a carrier cart and a lift, the articles might sometimes be concentrated, causing stagnation of carriages. Especially in an emergency where some of the carrier routes are rendered unusable due to a fault of any one of the facilities, carriages might severely stagnate. Furthermore, the operation status and the operating rate of the carriage facilities are not reflected in the selection of a carriage route, so that these facilities cannot be utilized effectively and carriage waiting time at each of these facilities tends to be elongated, thus resulting in uneconomical and inefficient carriage route selection in many cases.

SUMMARY OF THE INVENTION

In view of the above circumstances, it is an object of the present invention to provide a transportation system provided with a carrier cart for intra-floor carriage and a lift for inter-floor carriage in which carriage does not stagnate even upon occurrence of a fault of its facilities.

It is another object of the present invention to provide a transportation system equipped with a carrier cart for intra-floor carriage and a lift for inter-floor carriage that can utilize its carriage facilities effectively and shorten the carriage waiting time at each of the facilities, thus realizing efficient carriage.

A transportation system according to the present invention includes a plurality of lifts for inter-floor carriage, a carrier cart for intra-floor carriage and a transit stocker for loading/unloading of the lift. A lift to be used is decided based on at least one of operating or not of each lift, an operating rate of each lift, an inventory of each transit stocker, and a carriage queue for each lift.

Moreover, another transportation system according to the present invention includes a plurality of lifts for inter-floor carriage and a carrier cart for intra-floor carriage. A lift to be used decided based on operating rate of a carrier cart in each of the floor in such a manner that carriage distance is the smallest in the floor of the highest operating rate. Alternately, a lift to be used might be decided in such a manner that required time for carriage is the shortest in the floor of the highest operating rate.

According to the present invention, it is possible to select a carriage route based on the lift's operation situation, stocker's situation, and operating rate of the intra-floor transportation system to thereby select an optimal carriage route that has a short carriage waiting and a short carriage time.

Also, it is possible to prevent carriage from being stagnated at a lift or floor that has a low carriage capability. Further, it is possible to prevent occurrence of a carriage waiting owing to congested carriage at a specific lift or floor.

According to the present invention, therefore, it is possible to reduce the carriage waiting to thereby shorten the lead-time for finishing the product. Also, an effect of a possible fault on the carriage facilities can be reduced to a minimum.

These and other objects, advantages and features of the present invention will become more apparent from the following description and the accompanying drawings.

BRIEF DESCRIPTION OF THE DRAWINGS

FIG. 4 shows an example of a process flow table in the present invention;

FIG. 5 shows an example of a carriage route table in the present invention;

FIG. 6 shows an example of a stocker status table in the present invention;

FIG. 7 shows an example of a lift status table in the present invention;

FIG. 8 shows an example of priority type flag in the present invention;

FIG. 9 shows an example of a waiting list table in the present invention;

FIG. 10 shows an example of a floor status table in the present invention;

FIG. 11 shows another example of a process flow table in the present invention;

FIG. 12 shows an example of a process-stocker relation table in the present invention;

DETAILED DESCRIPTION

Hereinafter, embodiments of a transportation system according to the present invention will be described with reference to the accompanying drawings.

Figure 1:
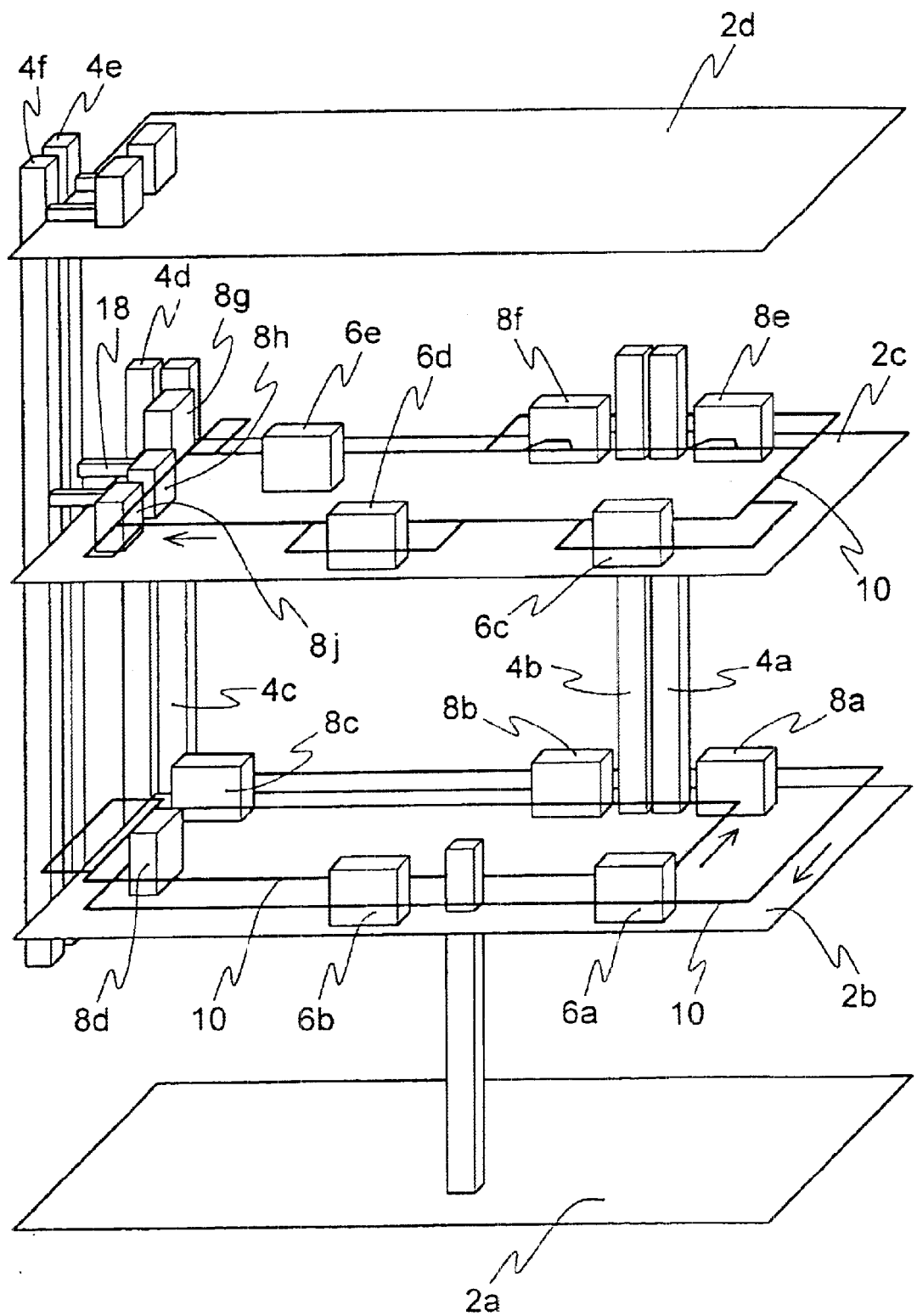
FIG. 1 is a diagram showing a transportation system according to the present invention.

As shown in FIG. 1, a manufacturing factory having a plurality of floors 2 (2a, 2b, 2c, and 2d) is provided with a transportation system according to the present invention for carrying a semi-processed product from one process to another.

The transportation system of the present invention comprises an intra-floor transportation system 10 for intra-floor carriage and lifts 4 (4a, 4b, . . . ) for inter-floor carriage. While the intra-floor transportation system 10 comprises a carrier cart for carrying an article (that is, semi-processed product) loaded thereon and a guide rail for guiding the carrier cart, only the guide rail thereof is shown in FIG. 1 in a thick line. Also, transit stockers 8 (8a, 8b, . . . ) are provided for transfer of the articles between the intra-floor transportation system 10 and the lift 4 (that is, between the carrier cart and the lift).

Next, a procedure for carrying an article is described. A semi-processed product as finished in processing by process equipment (not shown) is returned to stockers 6 (6a, 6b, . . . ) which are provided for each process respectively. This semi-processed product is then carried to the next process on another floor. The following will describe an example of carrying the semi-processed product at the stocker 6b to the stocker 6d, which is the stocker for the next process.

First, the intra-floor transportation system 10 carries the semi-processed product from the stocker 6b to the transit stocker 8a. The semi-processed product is temporarily stored at the transit stocker 8a and, when its turn comes around, loaded on the lift 4 to be carried to the transit stocker 8e on the floor 2c. The semi-processed product is temporarily stored at the transit stocker 8e and, when its turn comes around, carried by the intra-floor transportation system 10 to the next process of stocker 6d.

Figure 2:
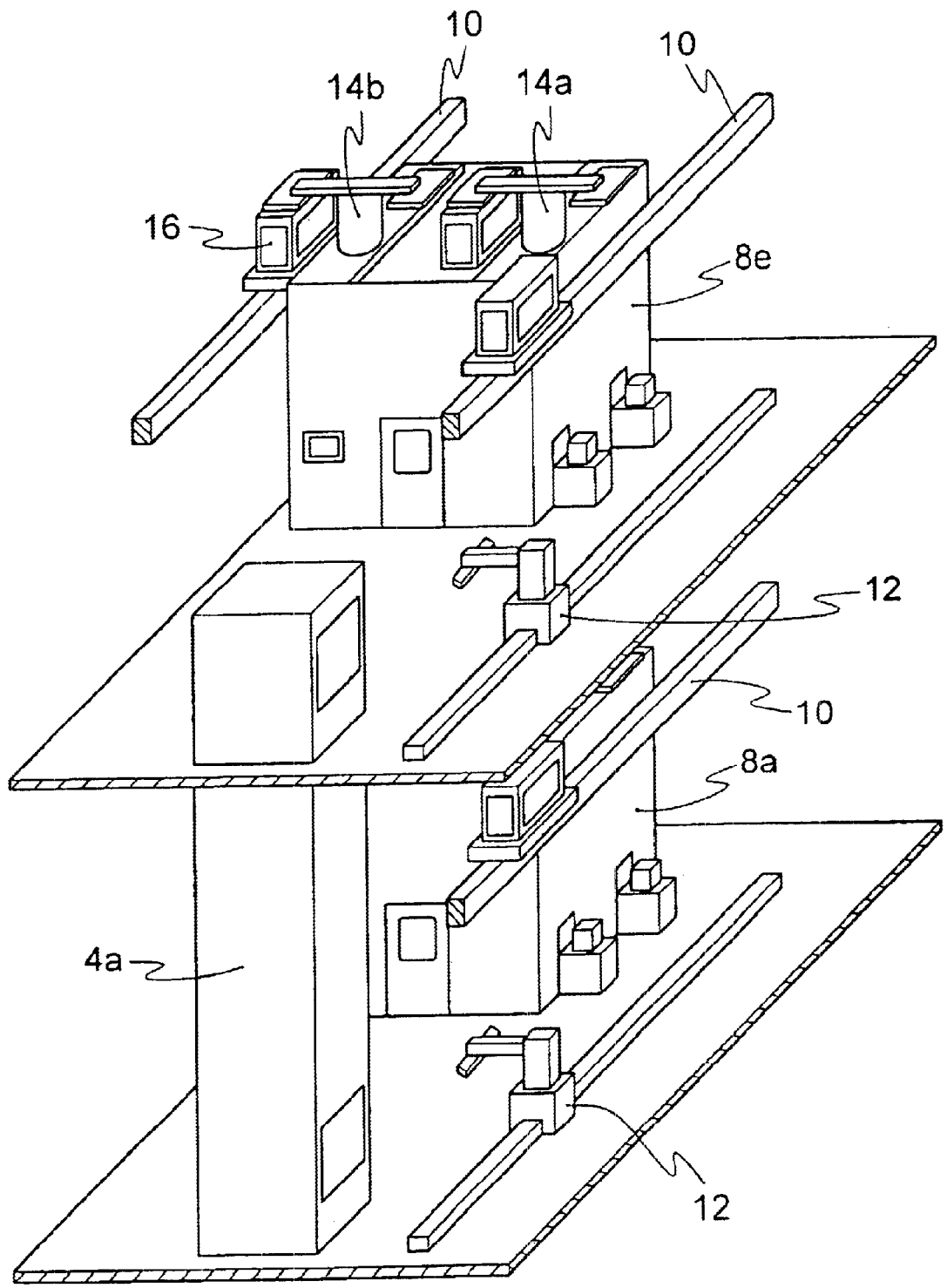
FIG. 2 is a diagram showing transfer of an article at a transit stocker.

Handling of the semi-processed product at the transit stocker is described in detail with reference to FIG. 2. The transit stockers 8 are each equipped with one or a plurality of transporters 14 (14a, 14b) and a conveyor robot 12 is disposed between the transit stocker 8 and the lift 4. The semi-processed product 16 carried by the intra-floor transportation system 10 is transferred by the transporter 14 into the transit stocker 8a. The semi-processed product is temporarily stored in the transit stocker 8a and, when its turn comes around, carried to the lift 4 by the conveyor robot 12. The semi-processed product is conveyed by the lift 4 to another floor and then carried by the conveyor robot 12 into the transit stocker 8e. The semi-processed product is temporarily stored in the transit stocker 8e and, when its turn comes around, handed over by the transporter 14 to the intra-floor transportation system 10.

It should be noted that there might be a case where a conveyor belt 18 is provided in place of the conveyor robot 12 between the lifts 4 (4e, 4f) and the transit socker 8 (8h, 8j) on the floor 2c of FIG. 1. Also, like the transit stocker 8d on the floor 2b of FIG. 1, the intra-floor transportation system 10 might be used for transfer between the lift 4 (4e, 4f) and the transit stocker 8 (8d).

Figure 3:
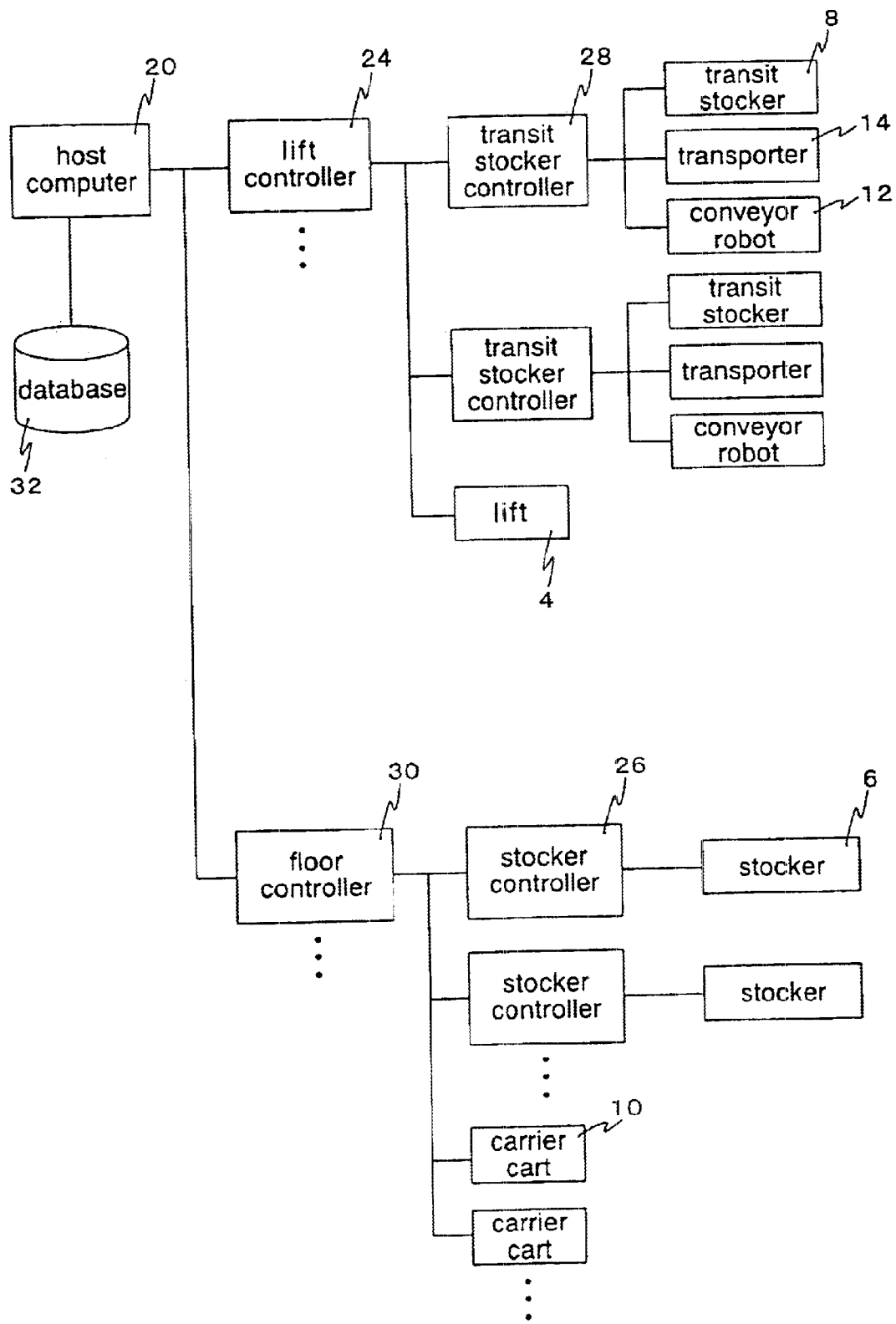
FIG. 3 is a block diagram showing a transportation system according to the present invention.

The transportation system of the present invention is controlled by a control system shown in, for example, a block diagram of FIG. 3.

As shown in FIG. 3, a lift controller 24 and a floor controller 30 are connected to a central host computer 20. Each floor controller 30 controls the intra-floor transportation system 10 on the corresponding floor and also controls each stocker 6 on the floor via a stocker controller 26. Each lift controller 24, on the other hand, controls the corresponding lift 4 and also controls, via a transit stocker controller 28, the transit stocker of this lift and the transporter 14 of the transit stocker 8. Also, each controller transmits to the host computer 20 such an operation situation as presence/absence of fault, inventory situation, current position, and whether an article is being carried for each lift, transit stocker, transporter, stocker, and carrier cart.

Further, the host computer 20 is connected with a database 32, which stores a process flow table describing a departure stocker and a destination stocker for each semi-processed product. An example of the process flow table is shown in FIG. 4. In the example of FIG. 4, the semi-processed product of lot No. 0001 is first carried from the stocker 6a to the stocker 6b and then from the stocker 6b to the stocker 6d. Meanwhile, completion flag "1" in the table shows completed carriage.

When the semi-processed product of the lot No. 0001 is finished in processing at the process and returned to the stocker 6b, information to that effect is transmitted from the stocker controller 26 of the stocker 6b through the floor controller 30 to the host computer 20. The host computer 20, when having received the information, retrieves the process flow table in the database 32 to know that the semi-processed product of lot No. 0001 is next destined to the stocker 6d and, therefore, controls the carrier cart, the transporter and the lift through the floor controller 30 and the lift controller 24 to thereby carry this semi-processed product to the stocker 6d.

Embodiment 1

In the conventional transportation system, if the lift 4a, the transit stocker 8a or 8e for the lift 4a, or the transporter of the transit stocker 8a or 8e was faulty when carrying the semi-processed product from the stocker 6b to the stocker 6d in the manufacturing factory as shown in FIG. 1, the carriage of the semi-processed product has been interrupted and resumed after recovery from the fault, so that lead-time for finishing the product is forced to increase.

To avoid this elongated lead-time, in the present embodiment, if the lift 4a cannot be used due to a fault, the semi-processed product is carried to the stocker 6d along a carriage route by way of any one of the other lifts 4 (4b, 4c, 4d, 4e, or 4f). Since there is no need to wait for fault recovery, the lead-time is not delayed and the lift in operation is effectively utilized.

To realize such switch-over of the carriage routes upon occurrence of fault on the carriage facilities, it is necessary only to preserve in the database 32 a carriage route table storing information of the carriage routes, a stocker status table storing situations of the stockers and a lift status table storing situations of the lifts.

Examples of the carriage route table, the stocker status table and the lift status table are shown in FIGS. 5 to 7 respectively.

As shown in FIG. 5, the carriage route table stores the lifts and transit stockers to be used in correlation with the departure and destination. In the example of FIG. 5, six carriage routes (route No. 501 to 506) are stored for the carriage from the departure stocker 6 to the destination stocker 6d. As shown in FIG. 6, the stocker status table describes therein the operation situations of the transit stockers and the transporters equipped to the transit stockers. In the example of FIG. 6, the transit stocker 8g is broken down and one of the transporters of the transit stocker 8c is broken down. As shown in FIG. 7, the lift status table describes therein the operation situations of the lifts. In the example of FIG. 7, the lift 4a is broken down.

Figure 14:
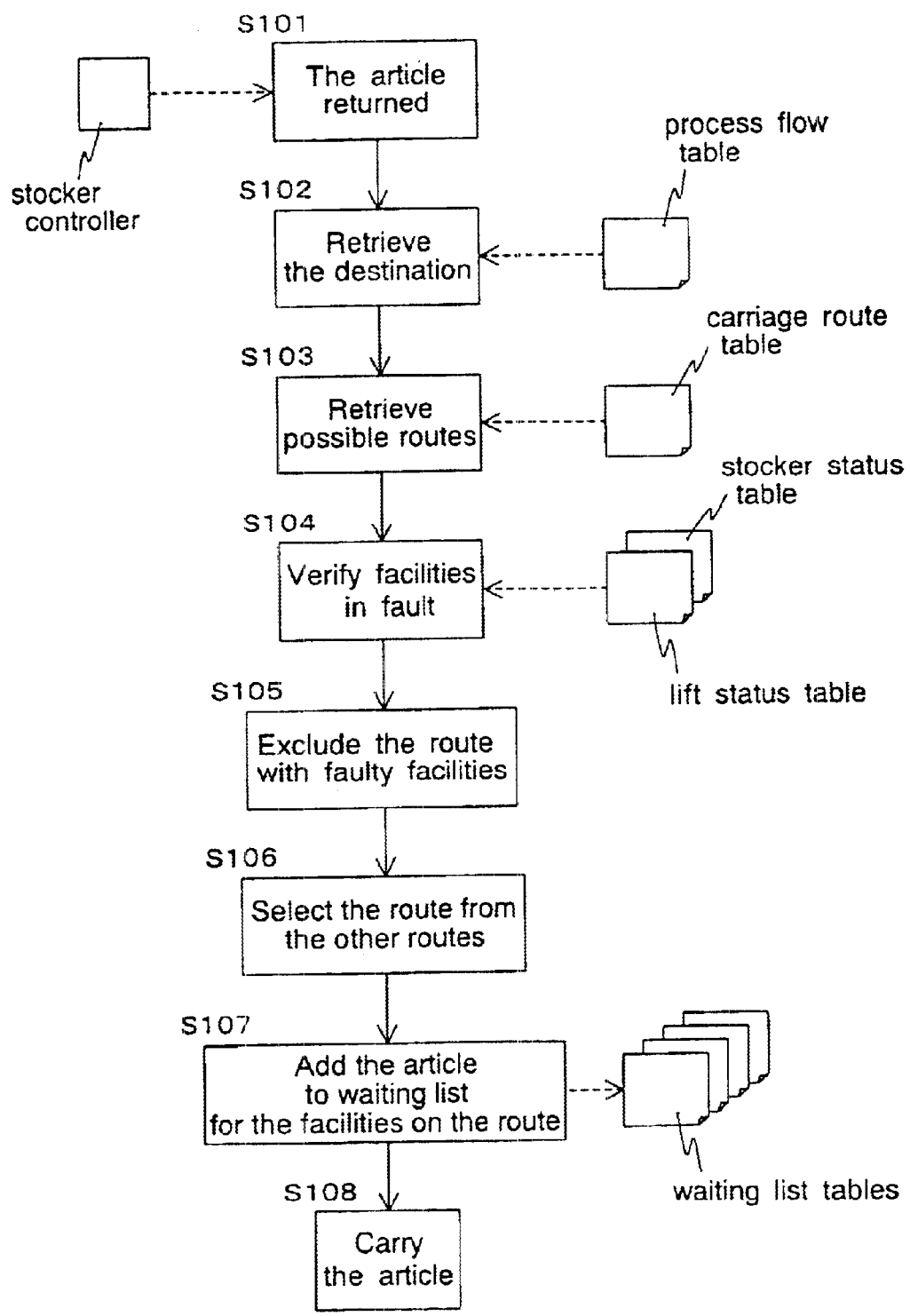
FIG. 14 is a flowchart showing operations of a transportation system according to the present invention.

The operations of the transportation system according to the present embodiment are described with reference to the flowchart of FIG. 14.

As mentioned above, the host computer 20 is notified by the stocker controller 26 of the information that the semi-processed product finished in processing at the process has returned to the stocker 6 (step S101). The host computer 20 then retrieves the process flow table in the database 32 to thereby check on which one of the stockers this semi-processed product must be carried to (step S102). Upon having known a departure (that is, current position) and a destination of the semi-processed product, the host computer 20 retrieves carriage routes that matches the departure and the destination from the carriage route table (step S103). The host computer 20 also verifies the stocker status table and the lift status table to thereby extract the faulty stockers, transporters, and lifts (step S104).

Of course, any carriage route that contains a faulty stocker, transporter, or lift is unusable. The host computer 20, therefore, removes such carriage routes that contain the faulty stocker, transporter, or lift from the candidates of selectable routes (step S105). Then, the host computer 20 determines the carriage route to be used among the remaining carriage routes (step S106). In the above example, since the transit stocker 8g and the lift 4a are broken down, the carriage routes 501, 503, and 504 are unusable, so that the host computer 20 determines the carriage route to be used among the remaining carriage routes 502, 505, and 506.

As described above, in the present embodiment according to the present invention, a plurality of carriage routes are prepared beforehand for each pair of a departure and a destination, so that a carriage route to be used is determined on the basis of whether any carriage facilities along the carriage route is broken down. Therefore, any other route can be used for carriage without waiting for recovery from the fault, thus preventing the lead-time from being delayed and also effectively utilizing the carriage facilities.

Embodiment 2

Ordinary, load is preferably assigned evenly to a plurality of lifts. Or conversely, there is a case where a specific lift might be preferred to the others in terms of carriage capability or carriage speed.

In this point of view, in the present embodiment, the database 32 is adapted to store a priority type flag for instructing a target situation. An example of the priority type flag is shown in FIG. 8. In the example of FIG. 8, priority type flag "A" indicates that the target situation is equalizing of the lift operating rate, while priority type flag "B" indicates that the target situation is preferential use of the lift 4a.

Further, in the present embodiment, the lift status table of FIG. 7 is provided with a field for storing the operating rate of each lift. Based on the information sent from the lift controller 24, the host computer 20 can calculate an operating rate for a predetermined period such as the past one hour or 15 minutes to then record it in this field.

As mentioned above, the host computer 20 can retrieve the process flow table in the database 32 to know the next destination of the semi-processed product. The host computer 20, therefore, first extracts from the carriage route table such carriage routes that match the departure and destination of the semi-processed product. For example, to carry the semi-processed product from the stocker 6b to the stocker 6d, the host computer 20 extracts six carriage routes of route Nos. 501–506 from the carriage route table.

Next, the host computer 20 retrieves the database 32 to know whether the priority type flag is set. If priority type flag "A" is set, the host computer 20 select a carriage route so that the lifts have an equal operating rate. That is, the host computer 20 reads out the operating rate of each lift from the lift status table in the database 32 to then determine such a lift that has the lowest operating rate. In the example of FIG. 7, the lift 4e has the lowest operating rate. The host computer 20, therefore, selects carriage route 505 that uses the lift 4e among the extracted six carriage routes 501–506. Also, if priority type flag "B" is set, on the other hand, the host computer 20 selects such carriage route that the lift 4a might be preferred to the others. That is, the host computer 20 selects carriage route 501 that uses the lift 4a.

As mentioned above, in the present embodiment, a target situation is stored as a priority type flag in the database so that a carriage route might be selected on the basis of an instruction of the priority type flag. Therefore, it is possible to prevent congestion due to uneven distribution of load by equalizing, for example, the load on the lifts. Thereby, the situation of carriage waiting is inhibited as much as possible, so that the lead-time for finishing product is shortened. Also, it is possible to preponderantly use on such a lift that is favorite in terms of carriage capability and speed, thus utilizing the carriage facilities effectively.

Embodiment 3

There is a case where unevenness in carriage load might cause a specific transit stocker to be full. In such a case also, the present invention makes it possible to select such a carriage route that goes through another transit stocker, thus avoiding situation of carriage waiting. When another carriage route is thus selected, however, it is not desirable if such a semi-processed product that needs to be carried rapidly is forced to go a long way around. Also, if some of the carriage facilities are broken down, there might occur such a case that no carriage routes but only one carriage route remain depending on the departure and the destination.

Therefore, in order to keep all the possible routes available for route selection, it is desirable to check the inventory of the transit stockers to thereby avoid them from being full.

To do so, in the present embodiment, the database 32 is adapted to store a priority type flag for instructing for a smaller inventory of the transit stockers as a target. In the example of FIG. 8, the priority type flag for instructing for a smaller inventory of the transit stockers is stored as priority type flag "C".

Further, in this embodiment, the stocker status table shown in FIG. 6 is provided with a field for storing inventory index of each stocker. The inventory index shows occupation of the stocker in percentage. Therefore, other fields for storing the capacity and the inventory of each stocker is preferably provided so that the inventory index might be calculated on the basis of these two fields. In the example of FIG. 6, moreover, the number of the semi-processed products which are expected to be brought in, i.e. the semi-processed products now on their carriage routes and the semi-processed products now in their departure stocker but their carriage routes are already assigned, is stored as the articles of expectancy. Furthermore, the semi-processed product now in processing by process equipment will be returned to the stocker for the process equipment. Therefore, the number of the semi-processed product is added to the number of the articles of expectancy to be stored as the reservations. Thus, the inventory index in the example of FIG. 6 is calculated as a percentage of the reservations and inventories to the capacity of each stocker.

As mentioned above, the host computer 20 can retrieve the process flow table in the database 32 to thereby know the next destination of the semi-processed product. First the host computer 20, therefore, extracts from the carriage route table such carriage routes that match the departure and destination of the semi-processed product.

Next, the host computer 20 retrieves the database 32 to decide whether a priority type flag is set. If priority type flag "C" is set, the host computer 20 selects from thus extracted carriage routes such a carriage route that has a small inventory index of a transit stocker to be used. That is, the host computer 20 reads out the inventory index of each stocker from the stocker status table in the database 32 to thereby determine such a stocker that has the lowest inventory index. In the example of FIG. 6, the stocker 8g has the lowest inventory index, so that the host computer 20 selects either one of carriage routes 503 and 504 which go by way of the transit stocker 8g.

Also, the sum of the inventory indexes of two transit stockers might be considered for each carriage route, and thereby a carriage route in which the sum of the inventory indexes is smallest might be selected.

As mentioned above, in the present embodiment, it is possible to select from a plurality of carriage routes such a carriage route that does not have a stocker of high inventory index. Therefore, filled up of a stocker is avoided, so that a carriage waiting due to the filled up stocker is prevented and a plurality of carriage routes are always kept as candidates for route selection. Also, it is possible to reduce the number of the semi-processed product stored in transit stockers, so that carriage waiting time at each of the transit stockers is shortened.

Embodiment 4

When carrying a semi-processed product from, for example, the stocker 6a to the stocker 6d via the lift 4a in the manufacturing factory shown in FIG. 1, there might be many cases where the lift 4a is congested to prolong the waiting for loading articles onto the lift. To guard against this, in this embodiment, a carriage route is determined taking the lift queue into account.

To determine in what order a plurality of semi-processed products are to be carried, for example, such a waiting list table as shown in FIG. 9 is used. FIG. 9 shows a waiting list table for the lift 4a. When a carriage route using the lift 4a is selected, the host computer 20 adds to this waiting list table a lot No., a departure transit stocker and a destination transit stocker of a semi-processed product (step S107 in FIG. 14). Also, a shelf for shelving the semi-processed product might be identified by its unique number or code, and the number or code of the shelf might be stored in the waiting list table. According to the waiting list table, the lift controller 24 controls the lift 4a in carriage of the semi-processed product.

Therefore, by counting the number of the semi-processed products stored in the waiting list table, it is possible to know the number of the lift queues. If a priority type flag indicates "use lift of fewer waiting", therefore, the host computer 20 retrieves such a lift that has the smallest number of the carriage queues using the waiting list table for each lift. Thus, the host computer 20 is enabled to select such a carriage route that uses the lift of the smallest queue.

According to the present embodiment, as described above, a carriage route is selected on the basis of the number of carriage queues for each lift to thereby shorten the carriage waiting, thus reducing the lead-time and effectively utilizing the carriage facilities.

Although the above description has exemplified the waiting list table of each lift, the waiting list table of a stocker, transporter or any other carriage facilities might be prepared to determine the carriage order. In the case where waiting list tables for respective stockers are prepared, the length of a queue in carriage from a departure stocker to a transit stocker and/or from a transit stocker to a destination stocker can be taken into account in selection of a carriage route. Thereby, the carriage waiting can be further decreased to shorten the lead-time and effectively utilize the carriage facilities.

Embodiment 5

Carriage might stagnate sometimes on a specific one of a plurality of floors owing to a difference in carriage capability between the intra-floor transportation systems on the floors.

To guard against this, in the present embodiment, the carriage route is selected so that a floor with a small carriage capability has the shortest carriage distance. For example, when the floor 2c has a smaller carriage capability than the floor 2b in FIG. 4, such a carriage route that the floor 2c has the shortest carriage distance is selected. Alternatively, based on a result of comparison of the operating rate of the intra-floor transportation system of the floors, there might be selected a carriage route in which the floor with the highest operating rate has the smallest carriage distance.

Thus, to select a carriage route based on the carriage capability or operating rate of each floor, it is necessary only to prepare such a floor status table in the database 32 that stores the situation of the intra-floor transportation system of each floor. An example of the floor status table is shown in FIG. 10. The floor status table stores the carriage capability of each floor. Moreover, the host computer 20 might calculate an operating rate of the intra-floor transportation system on each floor, for a predetermined period such as the past one hour or 15 minutes, based on the information sent from the floor controller 30. The operating rate thus calculated might also preferably stored onto the floor status table.

When instructed by the priority type flag "E" to give a priority on the carriage capability of the floor in selecting a carriage route, the host computer 20 references the floor status table to thereby decide which one of a departure floor and a destination floor has a smaller carriage capability. Thereafter, the host computer 20 selects such a carriage route that has the shortest carriage distance on the floor of smaller carriage capability. The carriage route table of FIG. 5, therefore, stores the distance of the carriage path on each floor for each carriage route.

In the above example, the departure stocker 6b is on the floor 2b and the destination stocker 6d, on the floor 2c. The floor status table of FIG. 10 indicates that the floor 2c has a smaller carriage capability than the floor 2b. Therefore, from among carriage routes of route Nos. 501–506 in the carriage route table of FIG. 5, such a carriage route of route No. 506 is selected that has the shortest carriage distance on the floor 2c.

Also, if instructed by the priority type flag "F" to equalize the operating rate of the floors as much as possible in selecting a carriage route, the host computer 20 references the floor status table to thereby compare the operating rate between a departure floor and a destination. Thereafter, the host computer 20 selects such a carriage route that has the shortest carriage distance on the floor of higher operating rate. In the above example, the floor 2c has a higher operating rate than the floor 2b, so that such a carriage route of route No. 506 that has the shortest carriage distance on the floor 2c is selected.

According to the present embodiment, as described above, a carriage route is selected on the basis of the carriage capability of each floor, so that the floor with a small carriage capability can be prevented from being stagnated. Therefore, the carriage facilities can be utilized efficiently to thereby reduce the carriage waiting time and the required time for carriage, thus shortening the lead-time for finishing product. Also, by selecting a carriage route based on the operating rate of the floors, the load can be equalized for each of the floors, thus solving such a problem that a specific floor is stagnated, which in turn provides a bottleneck to thereby decrease the overall carriage efficiency. Therefore, the carriage facilities can also utilized efficiently to thereby reduce the carriage waiting and the required time for carriage, thus shortening the lead-time.

Although the above example has selected a carriage route having shortest carriage distance on such a floor that might possibly be a bottleneck, that is, that has a small carriage capability or a high operating rate, there might be selected a carriage route having the shortest required time for carriage on the floor. In this case, the carriage route table can store the required carriage time in each floor for each carriage route in place of the carriage distance of each floor.

Embodiment 6

In the above-mentioned embodiments, a destination stocker, to which a semi-processed product is to be carried, have previously determined. That is, as indicated in the process flow table of FIG. 4, for example, a semi-processed product with lot No. 0001 is decided beforehand to be carried to the stocker 6d after the processing at the process of the stocker 6b.

When there is a plurality of process equipments for performing the same kind of processing, however, there is not always a need to determine a destination stocker beforehand. In such a case, in place of the process flow table of FIG. 4, it is necessary only to prepare beforehand such a process flow table as shown in FIG. 11 that records the pre-process (present process in FIG. 11) and the post-process (next process in FIG. 11) sequentially and also such a process-stocker relation table as shown in FIG. 12 that records the relationship between the processes and the stockers.

In the example of a process flow table of FIG. 11, a semi-processed product of lot No. 0001 is to be subjected to the process P6 after processing of the process P2. In a process-stocker relation table of FIG. 12, on the other hand, the processing of the process P6 can be performed by process equipment associated with the stocker 6e as well as process equipment associated with the stocker 6d. Therefore, the semi-processed product returned to the stocker 6b after being processed at the process P2 might be carried next to the stocker 6d or 6e.

Therefore, when extracting carriage routes from the carriage route table, the host computer 20 extracts such carriage routes that have the stocker 6b as a departure and the stocker 6d as a destination as well as such carriage routes that have the stocker 6b as the departure and the stocker 6e as the destination. At the next step, from among thus extracted carriage routes, the host computer 20 selects a carriage route to be used on the basis of an operation situation of the carriage facilities along each carriage route, an instruction indicated by the priority type flag, an inventory of the transit stockers and the like.

As mentioned above, according to the present embodiment, the present invention is adapted for the case where the destination is selectable among a plurality of stockers and there are a plurality of carriage routes available for each destination stocker. It is possible to select an optimal carriage route in accordance with the current situation, thus preventing delaying of the lead-time and also effectively utilizing the carriage facilities.

In the present embodiment, the situation of a destination stocker might well be taken into account when determining a carriage route. For example, if the stocker 6d has a large inventory index in the stocker status table of FIG. 6, such a carriage route that has this stocker as the destination should not be selected. If the number of products expected to be carried in is large, that is, that carry-in queue is long, such a carriage route that has this stocker as the destination should not be selected. Such selection can be made by setting the priority type flag as mentioned above.

Embodiment 7

There are cases where a specific semi-processed product is desired to be carried in a super-express because the delivery time limit of the product is coming near. To accommodate such a situation, in the present embodiment, each product is assigned a priority so that for a semi-processed product with a high priority, such a carriage route might be selected that has the shortest required time for carriage. For this purpose, therefore, a priority field for storing the priority of each semi-processed product is provided beforehand to the process flow table of FIG. 5. Also, a required time field for storing the required carriage time for each route should preferably be provided to the carriage route table of FIG. 5.

Moreover, it is meaningless if such a route that has the shortest required time is selected but a carriage waiting is encountered due to a long carry queue at, for example, a lift along this route. To guard against this, such a semi-processed product that has a high priority is to be broke into the carry queue. As mentioned above, for each carriage facilities, such a waiting list table that is shown in FIG. 9 is prepared, and according to which the lift controller 24 and the floor controller 30 conduct control in carrying of the products. Therefore, a semi-processed product with a high priority is allowed to break into the waiting queue, so that it is stored at the top position of the waiting list table.

These scheme make it possible to carry a semi-processed product with a high priority along a carriage route with the shortest required time with little carriage waiting time.

Embodiment 8

Figure 13:
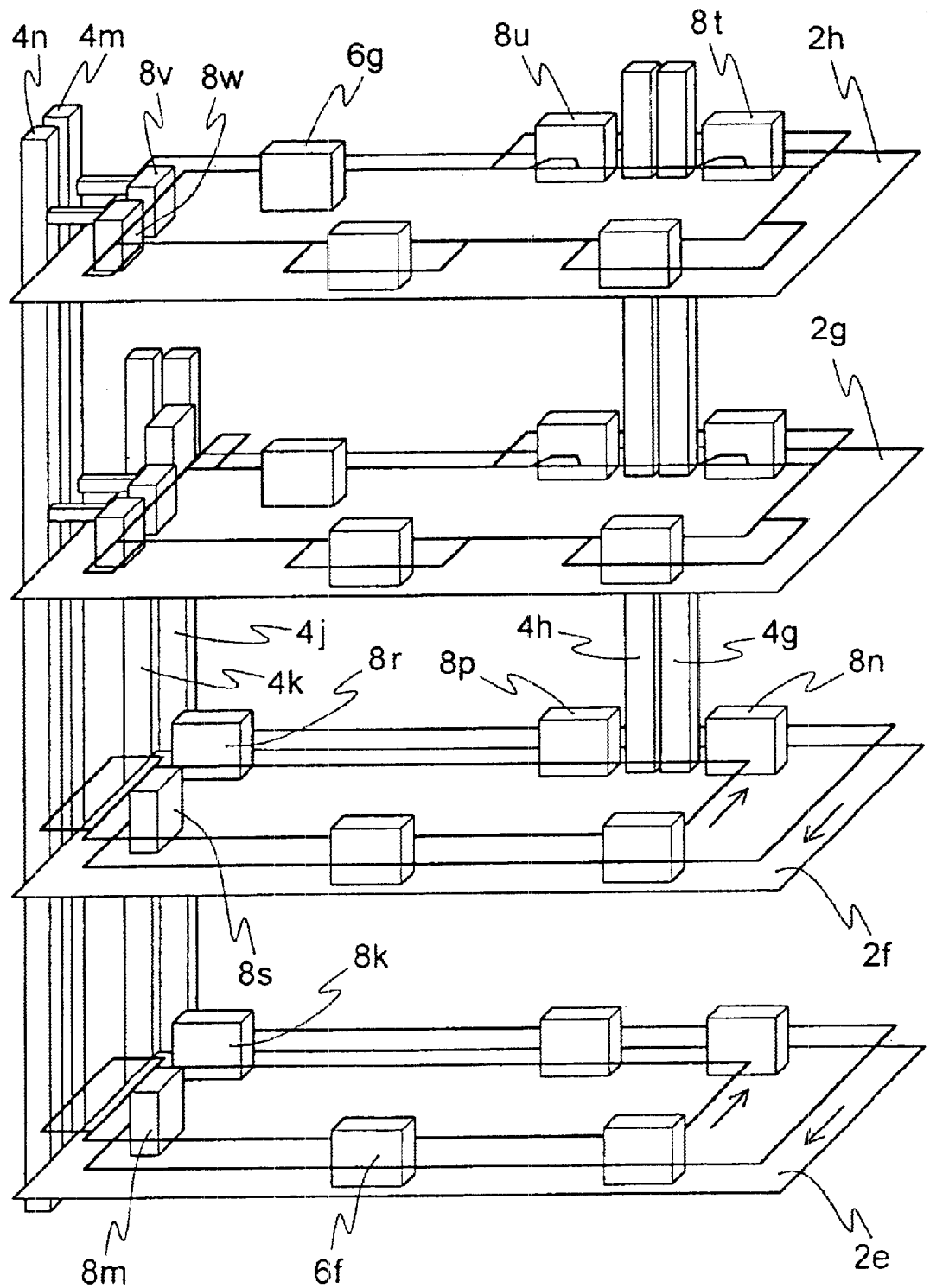
FIG. 13 is a diagram showing a transportation system according to the present invention.

When a semi-processed product at the stocker 6f is to be carried to the stocker 6g in, for example, a manufacturing factory as shown in FIG. 13, there might be employed a carriage route using one lift 4m (or lift 4n) and a carriage rout using a lift 4j (or lift 4k) and a lift 4h (or lift 4g).

In such a case also, the carriage route might well be selected according to the priority of the semi-processed products. For a semi-processed product with a high priority, all the possible routes, that is, the direct carriage routes using one lift and the bypass carriage routes using a plurality of lifts, are retrieved as candidates. Thereafter, an appropriate route to be used is selected among the above retrieved routes on the basis of the operation status, operating rate, inventory situation, queue and the like. For a semi-processed product with a low priority, on the other hand, an appropriate carriage route to be used might well be selected from among the bypass carriage routes using a plurality of lifts.

It is thus possible to carry products according to the priority order to thereby reduce the required carriage time for the semi-processed products with a high priority, thus shortening the lead-time for finishing the product.

Embodiment 9

If a transporter of the transit stocker 8a is broken down and unusable when carrying a semi-processed product from the stocker 6b to the stocker 6d in the manufacturing factory as shown in FIG. 1, for example, the lift 4b is used to carry the semi-processed product. This can be realized by defining the stocker operation status to be fault in the stocker status table if all the transporters equipped to the transit stocker are broken down.

Also, if, like the transit stocker 8e shown in FIG. 5, a stocker is equipped with a plurality of transporters 14a and 14b, the transporter 14b can be used in place of the faulty transporter 14a to carry the product. This can also be realized by defining the stocker operation status to be fault in the stocker status table if all the transporters equipped to the stocker are broken down. Alternately, the carriage route table might be more detailed to record transporters on each route and transporter states tables might be prepared to store operating status of each transporter, in order to exclude such carriage routes having a faulty transporter thereon from candidates for carriage route selection.

As mentioned above, according to the present invention, if a transporter is broken down, another transporter or another lift which is not associated with the broken transporter can be used to continue carriage. It is, therefore, possible to effectively utilize the carriage facilities without waiting in carriage or delaying the lead-time owing to a fault on the transporter.

Embodiment 10

There might be such a case that a fault occurs on a lift or a transporter along a carriage route after this route is selected and a product is in a carry queue or being carried. To accommodate such a situation, in the present embodiment, the carriage route is selected again.

Assume that a fault occurred on the lift 4a during carriage of a semi-processed product from the stocker 6b to the stocker 6d in, for example, the manufacturing factory as shown in FIG. 1. If, in such a case, the semi-processed product is in its carry queue and has not yet started from the stocker 6b, the host computer 20 re-selects such a carriage route that has the stocker 6b as a departure and the stocker 6d as a destination.

Also, if the semi-processed product is being carried toward the transit stocker 8a of the lift 4a, the carriage is continued to transport the semi-processed product into the transit stocker 8a. Thereafter, the host computer 20 selects such a carriage route that has the transit stocker 8a as the departure and the stocker 6d as the destination. Since there might probably be a plurality of carriage route form the transit stocker 8a to the stocker 6d, as mentioned above, an appropriate carriage route might well be selected from among them based on the operation status, operating rate, inventory situation, queue and the like.

As described above, in the present embodiment, if a lift or a transported is broken down during carriage, another carriage route is selected in carriage without waiting for the recovery from the fault. It is, therefore, possible to avoid suspension of carriage of a semi-processed product to thereby prevent a delay in lead-time. Also the carriage facilities not faulty can be utilized effectively.

Although the embodiments of the present invention have been described with reference to a few examples, the present invention is not limited to them. For example, the configuration (stored contents) of each table constituting the database is not limited to the exemplified one. The tables must only be such that the host computer can reference its necessary information (stored contents). Also, the configurations of the host computer, lift controller, floor controller, stocker controller, and transit stocker controller are not limited to the exemplified ones. They must only be such that the host computer can control such carriage facilities as each lift, stocker, and transporter.

Also, although the drawings illustrate the transportation system of the present invention as that of the on-the-ceiling carriage type, of course, it might be of the on-the-ground traveling type. Also, the carriage track for the carrier cart in the intra-floor transportation system might be of a double-annular loop type having clockwise and counterclockwise loops like the floor 2b or a single loop type like the floor 2c. Further, although the drawings illustrate an example where the different floors share the same ward of a building, some of them might be in the different wards or different buildings so that the lift can be replaced by a conveyor or an escalator for inter-floor carriage of the products.

What is claimed is:

1. A transportation system for transporting articles between inter-floor locations on different floors of plurality of floors and between intra-floor locations on any one of the floors, the transportation system comprising:

a plurality of lifts, each lift carrying articles between inter-floor locations floors on different floors of a plurality floors;

respective carrier carts on respective floors for carrying articles between intra-floor locations within any one of the respective floors;

respective transit stockers on respective floors for receiving articles from and delivering articles to a carrier cart on the respective floor and for delivering articles to and receiving articles from any of the plurality of lifts when stopped at the respective floor; and a central control controlling operation of the plurality of lifts, the respective carrier carts, and the respective transit stockers, the central control monitoring, as operating parameters of the transportation system,
which lifts are operating and which lifts are out of service,
operating rates of each of the lifts,
degree of fullness of each transit stocker, and
queues of articles waiting for carriage by respective lifts, wherein the central control selects a lift from the plurality of lifts for transporting each lot of articles between floors based upon at least one of the operating parameters.

2. A transportation system for transporting articles between inter-floor locations on different floors of plurality of floors and between intra-floor locations on any one of the floors, the transportation system comprising:

a plurality of lifts, each lift carrying articles between inter-floor locations floors on different floors of a plurality floors;

respective transit stockers on respective floors for receiving articles from and delivering articles to a carrier cart on the respective floor and for delivering articles to and receiving articles from any of the plurality of lifts when stopped at the respective floor, an intra-floor transportation system for each floor comprising the carrier carts and transit stockers of the respective floor; and a central control controlling operation of the plurality of lifts, the respective carrier carts, and the respective transit stockers, the central control calculating operating rate of the intra-floor transportation system for each floor, wherein the central control selects a lift from the plurality of lifts for transporting a lot of articles from a departure floor to a destination floor and selects a route of a carrier cart carrying the lot of articles on the one of the departure and destination floors that has the intra-floor transportation system with the higher operating rate so that carriage distance of the route selected is shorter than carriage distance for any other route on the one of the destination and departure floor having the higher intra-floor transportation system operating rate.

3. A transportation system for transporting articles between inter-floor locations on different floors of plurality of floors and between intra-floor locations on any one of the floors, the transportation system comprising:

a plurality of lifts, each lift carrying articles between inter-floor locations floors on different floors of a plurality floors;

respective transit stockers on respective floors for receiving articles from and delivering articles to a carrier cart on the respective floor and for delivering articles to and receiving articles from any of the plurality of lifts when stopped at the respective floor, an intra-floor transportation system for each floor comprising the carrier carts and transit stockers of the respective floor; and a central control controlling operation of the plurality of lifts, the respective carrier carts, and the respective transit stockers, the central control calculating operating rate of the intra-floor transportation system for each floor, wherein the central control selects a lift from the plurality of lifts for transporting a lot of articles from a departure floor to a destination floor and selects a route of a carrier cart carrying the lot of articles on the one of the departure and destination floors that has the intra-floor transportation system with the higher operating rate so that carriage time of the route selected is shorter than carriage time for any other route on the one of the destination and departure floor having the higher intra-floor transportation system operating rate.

* * * * *